United States Patent
Yacoub (10) Patent No.: US 8,857,153 B2
(45) Date of Patent: Oct. 14, 2014

(54) METHOD FOR MEASURING THE QUALITY OF AMMONIA INJECTION FOR AN EXHAUST GAS AFTER TREATMENT SYSTEM OF A VEHICLE

(75) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 13/267,779

(22) Filed: Oct. 6, 2011

(65) Prior Publication Data
US 2012/0090296 A1    Apr. 19, 2012

(30) Foreign Application Priority Data

Oct. 14, 2010 (DE) .......................... 10 2010 038 176

(51) Int. Cl.
*F01N 3/00* (2006.01)
*F01N 3/20* (2006.01)

(52) U.S. Cl.
CPC ........... *F01N 3/208* (2013.01); *F01N 2560/026* (2013.01); *F01N 2250/05* (2013.01); *F01N 2610/02* (2013.01); *Y02T 10/24* (2013.01); *F01N 2560/021* (2013.01)
USPC .................... 60/274; 60/286; 60/285; 60/276

(58) Field of Classification Search
USPC .................................................. 60/274–303
See application file for complete search history.

(56) References Cited

U.S. PATENT DOCUMENTS

| | | | |
|---|---|---|---|
| 7,587,890 B2 * | 9/2009 | Stroia et al. ..................... 60/286 |
| 8,281,570 B2 * | 10/2012 | Gierszewski et al. ........... 60/286 |
| 8,336,525 B2 * | 12/2012 | Runde et al. ................... 123/479 |
| 2007/0204600 A1 * | 9/2007 | Kubinski et al. ................. 60/286 |
| 2009/0038299 A1 * | 2/2009 | Gierszewski et al. ........... 60/301 |
| 2010/0064662 A1 * | 3/2010 | Hinz et al. ....................... 60/274 |
| 2010/0115918 A1 * | 5/2010 | Sawada et al. .................. 60/276 |
| 2010/0122525 A1 * | 5/2010 | Fujita et al. ..................... 60/285 |
| 2010/0154386 A1 * | 6/2010 | Perrin et al. .................... 60/277 |
| 2011/0093182 A1 * | 4/2011 | Weber et al. .................. 701/102 |
| 2011/0146240 A1 * | 6/2011 | Wilhelm et al. ................ 60/274 |

FOREIGN PATENT DOCUMENTS

| | | |
|---|---|---|
| EP | 2208873 A1 | 7/2010 |
| FR | 2929329 A1 | 10/2009 |
| JP | 2010163923 A | 7/2010 |

* cited by examiner

*Primary Examiner* — Jesse Bogue
*Assistant Examiner* — Kelsey Stanek
(74) *Attorney, Agent, or Firm* — Julia Voutyras; Alleman Hall McCoy Russell & Tuttle LLP (57) ABSTRACT

A system and method for determining a rate of ammonia deposition and controlling an engine is described. In one example, an amount of ammonia deposited in an engine exhaust is determined and the deposited ammonia is purged after the amount of ammonia deposited reaches a threshold level. The method may decrease ammonia use and ammonia emissions from a vehicle.

18 Claims, 3 Drawing Sheets

METHOD FOR MEASURING THE QUALITY OF AMMONIA INJECTION FOR AN EXHAUST GAS AFTER TREATMENT SYSTEM OF A VEHICLE

RELATED APPLICATIONS

This application claims priority to German Patent Application No. 102010038176.4, filed Oct. 14, 2010, the entire contents of which are herein incorporated by reference for all purposes.

FIELD

The present description relates to a method for measuring the quality of ammonia ($NH_3$) injection for an after treatment system on a motor vehicle. The description furthermore relates to an apparatus for measuring the quality of ammonia injection and to an after treatment system on a motor vehicle. In particular, the description relates to after treatment of the exhaust from an internal combustion engine of a motor vehicle.

BACKGROUND AND SUMMARY

Injecting aqueous ammonia directly into the exhaust system upstream of an SCR catalytic converter (Selective Catalytic Reaction) is used to convert the NOx emissions in the exhaust gas into nitrogen and water vapor. The temperature of the exhaust gas should be above a minimum threshold temperature of at least 220° C. in order to ensure correct vaporization of the ammonia or urea.

In order to achieve the required degree of NOx conversion, injection of ammonia typically starts while the exhaust gas is still at a temperature below the required optimum threshold temperature, e.g. at 170° C. Moreover, it may be desirable to employ a mixer in the exhaust gas in order to ensure improve mixing of the injected ammonia with the exhaust gas. Injection at low temperatures can lead to poor vaporization of the injected aqueous ammonia and furthermore to deposition of ammonia in and on the injection nozzle and in the exhaust tract.

The ammonia deposits can have a negative effect on the quality of mixing and hence on the ability of the SCR catalytic converter to convert the NOx emissions. Finally, the deposition of ammonia can lead to a deviation between an expected or desired amount and the actual amount of ammonia injected, especially at low temperatures and/or when there are already deposits on the injection nozzle and/or the mixer. This may impair accuracy of an ammonia memory model and of the alpha ratio (moles of ammonia to moles of NOx) in the upstream part of the exhaust stream.

The description herein may improve the quality of ammonia injection in the after treatment system on a motor vehicle. According to the description, improved ammonia injection may be achieved by the features of the claims.

The inventor herein has recognized the above-mentioned disadvantages and has developed an engine system, comprising: an engine including an exhaust passage; an ammonia injector positioned in the exhaust passage; a differential NOx and ammonia sensing device sensing exhaust gases upstream and downstream of the ammonia injector; and a controller including instructions for adjusting engine operation in response to an output of the differential NOx and ammonia sensing device.

By determining an amount of ammonia deposited in an exhaust system via a differential sensor that is capable of sensing NOx and ammonia, it may be possible to regenerate or improve performance of emissions control devices including sensors and actuators via an ammonia purge cycle. In one example, ammonia deposited on an ammonia injector can be removed via increasing temperature at the tip of the ammonia injector. In other examples, exhaust gas temperatures can be increased so as to promote release of ammonia deposited in the exhaust system.

The present description may provide several advantages. Specifically, the approach may reduce engine emissions via improving mixing of ammonia in exhaust gases to facilitate NOx reduction. Further, the approach may be useful for determining degradation of an ammonia injection system so that an operator can be prompted to take measures to correct the degradation and thereby reduce engine emissions. Further still, the approach may help to reduce emissions of ammonia from a vehicle.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

The drawings included herein serve merely for the explanation of the description, and do not restrict the description. The drawings and the individual parts are not necessarily drawn to scale. The reference symbols that are common to more than one figure are used to denote identical or similar parts between different figures.

DETAILED DESCRIPTION

Figure 1:
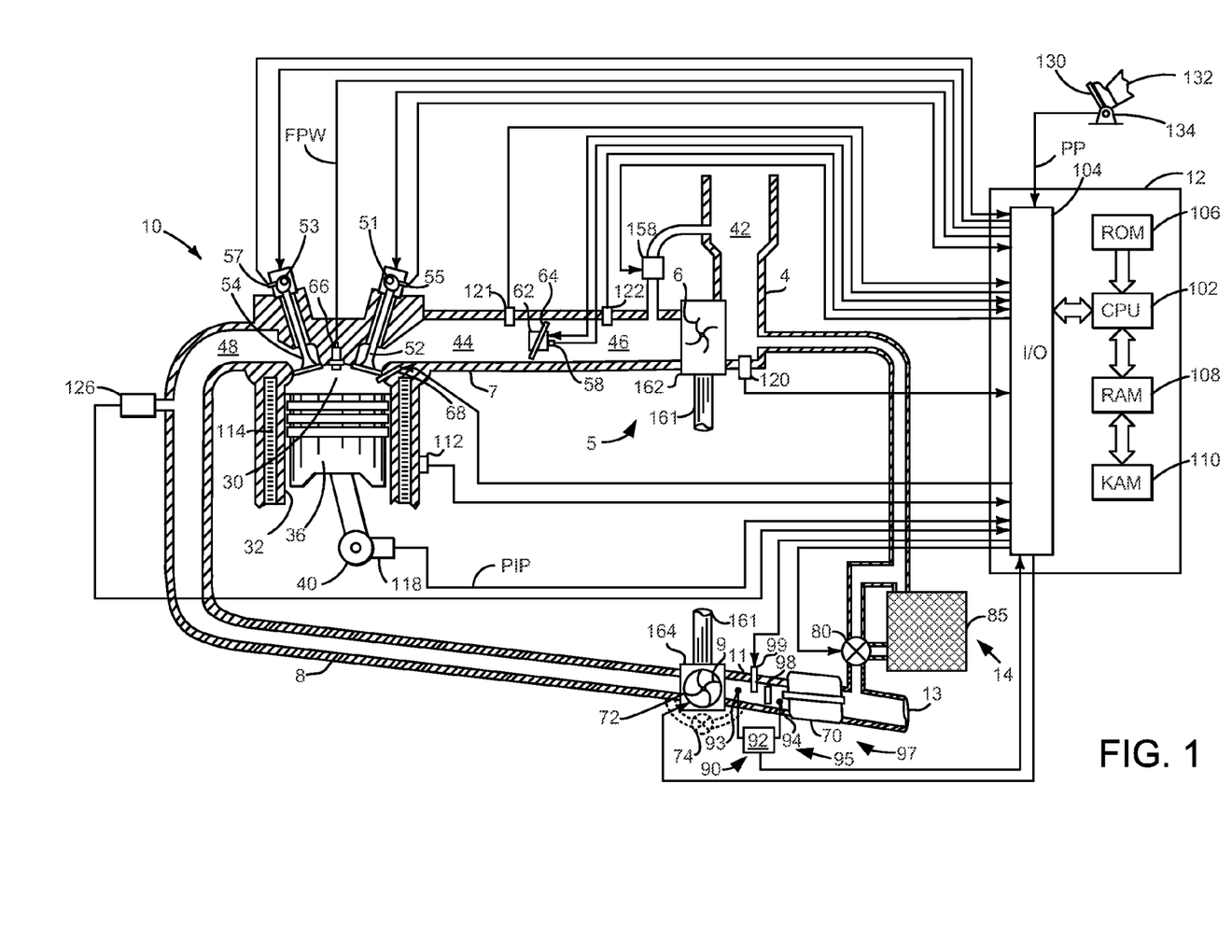
FIG. 1 is a schematic diagram of an engine.
Figure 2:
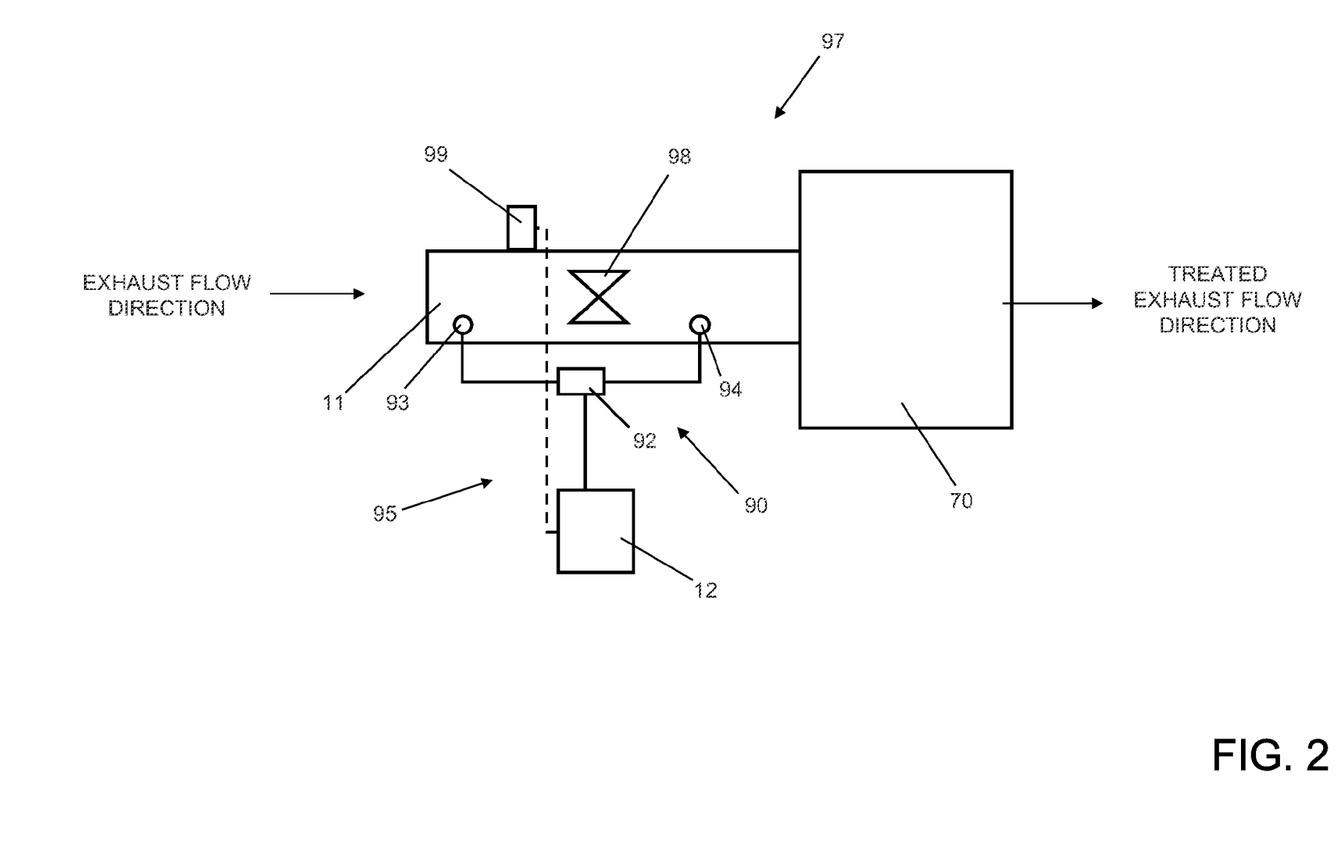
FIG. 2 is a detailed schematic diagram of an exhaust gas after treatment system.

The present description is related to determining quality of ammonia injection to an engine exhaust system. In one example, the exhaust system may be configured as shown in FIGS. 1 and 2. Further, the quality of ammonia injection may be determined according to the method described in FIG. 3.

According to a first aspect of the description, a method for measuring the quality of ammonia injection for an after treatment system on a motor vehicle, having a position of injection into the exhaust stream, has the following steps: measuring the difference between the NOx concentration upstream of the position of injection and the total NOx and ammonia concentration downstream of the position of injection; evaluating the measurement signal, which is correlated with the concentration of ammonia injected.

This measurement, which can be carried out with a differential sensor for example, allows accurate determination of the ammonia concentration downstream of the position of injection. It is also possible to use two different sensors and for the difference between the two measurement signals to be calculated in a logic unit or controller. The method allows simple and reliable measurement of the ammonia injected. The measurement signal can be compared with the value that can be calculated from the characteristics of the injection system such as opening time if the ammonia injector and pressure of ammonia supplied to the ammonia injector.

A value of zero for the measurement signal can indicate that no ammonia is being injected. A value greater than zero for the measurement signal can indicate that ammonia is being injected. The magnitude of the measurement signal can correlate with the concentration and/or quantity of ammonia injected to the exhaust system.

The ammonia concentration can be converted into a mass flow of ammonia injected to the exhaust system. This can be carried out selectively if the value of the measurement signal is greater than zero.

The quantity of ammonia injected can be corrected in accordance with the measurement signal. The measurement method per se is thus expanded to provide closed-loop control of ammonia injection.

The quantity of ammonia injected can be between a maximum and a minimum limit. The limits can be used to check whether the value measured for the ammonia (obtained from the injection system for example via pressure of ammonia supplied to the ammonia injector and injector on time) is within the limits around the expected value.

A clogged or blocked injection nozzle can be detected from a mass flow that is below an expected value or a minimum limit. This diagnostic facility enhances the reliability of the overall exhaust after treatment system.

A regeneration cycle can be initiated and/or a warning generated in the case of a clogged or blocked injection nozzle. For example, the tip of the injection nozzle can be heated in a regeneration cycle if the injection nozzle is clogged in order to vaporize the deposit. In the case of clogging, a warning or diagnostic message can be generated for example, and this can then be fed to the engine management system.

The function of detecting a clogged or blocked injection nozzle can be checked with the fuel supply switched off and a minimum injection of ammonia. With the fuel supply switched off, the NOx concentration in the exhaust is equal to zero, thus making it a simple matter to check the ammonia concentration. In one example, the fuel may be shut off and the ammonia concentration checked during vehicle deceleration. Thus, the exhaust system contents become a mixture of air and ammonia. In this way, it is possible to check the ability to function of the injection nozzle after a regeneration cycle, for example.

The deposition rate of ammonia can be calculated by integrating the difference between the expected amount of ammonia and the measured amount of ammonia. In this way, the quantity of deposited ammonia can be calculated and tracked over time.

Using the deposition rate, the mass of ammonia deposited can be calculated and a heating strategy for vaporizing the deposits can be carried out. This allows preventative treatment of the deposits. Thus, the deposits can be vaporized before there is any impairment in the after treatment system, thereby increasing the quality and service life.

A memory model can be provided that takes into account the vaporization of the deposited ammonia for calculation of the rate of ammonia to be injected. The vaporized components increase the concentration of ammonia. Allowing for these components makes it possible to maintain the level of ammonia more accurately and thus increases the quality of the after treatment system.

According to a second aspect of the description, an apparatus for measuring the quality of ammonia injection for an after treatment system on a motor vehicle, having a position of injection into the exhaust stream, comprises a first measuring point for the NOx concentration upstream of the position of injection, a second measuring point for the total NOx and ammonia concentration downstream of the position of injection, and a differential logic unit for the purpose of forming a difference between the NOx concentration and the total NOx and ammonia concentration. The apparatus allows simple and reliable measurement of the ammonia concentration.

A differential sensor which comprises the first measuring point, the second measuring point and the differential logic unit makes it possible to construct the system in a simple, reliable and economical manner.

According to another aspect of the invention, an after treatment system on a motor vehicle comprises an above-described apparatus for measuring the quality of ammonia injection. For better integration, the measuring apparatus can be part of the after treatment system. Thus, data flow can be simplified, for example, since fewer interfaces are required and/or identical protocols are used.

Referring now to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers fuel in proportion to the pulse width of signal FPW from controller 12. Fuel is delivered to fuel injector 66 by a fuel system (not shown) including a fuel tank, fuel pump, fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 via supply line 7, and electronic throttle 62 adjusts a position of throttle plate 64 to control air flow from intake boost chamber 46. Turbocharger 5 includes compressor 162 which draws air from air intake inlet 42 via inlet air line 4 and compressor vanes or blades 6 to supply air to boost chamber 46. Exhaust gases spin turbine vane or blade 9 of turbine 164 which is coupled to compressor 162 via shaft 161. In some examples, a charge air cooler may be provided. Compressor speed may be adjusted via adjusting a position of variable vane control 72 or compressor bypass valve 158. In alternative examples, a waste gate 74 may replace or be used in addition to variable vane control 72. Variable vane control 72 adjusts a position of variable geometry turbine vanes 9. Exhaust gases can pass through turbine 164 supplying little energy to rotate turbine 164 when vanes are in an open position. Exhaust gases can pass through turbine 164 and impart increased force on turbine 164 when turbine vanes 9 are in a closed position. Alternatively, wastegate 74 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce intake manifold pressure.

Combustion is initiated in combustion chamber 30 when fuel automatically ignites as piston 36 approaches top-dead-center compression stroke. In some examples, a universal Exhaust Gas Oxygen (UEGO) sensor 126 may be coupled to exhaust manifold 48 upstream of emissions device 70. Discharge line 8 directs exhaust gases to turbine 164. In other examples, the UEGO sensor may be located downstream of one or more exhaust aftertreatment devices. Further, in some examples, the UEGO sensor may be replaced by a NOx sensor that has both NOx and oxygen sensing elements. Exhaust gas exits at exhaust system opening 13.

At lower engine temperatures glow plug 68 may convert electrical energy into thermal energy so as to raise a temperature in combustion chamber 30. By raising temperature of combustion chamber 30, it may be easier to ignite a cylinder air-fuel mixture via compression.

Emissions device 70 can include a particulate filter and catalyst bricks, in one example. In another example, multiple emission control devices, each with multiple bricks, can be used. In other examples, the emissions device may include a lean NOx trap or a selective catalyst reaction (SCR) catalyst, lean NOx trap (LNT), and/or a diesel particulate filter (DPF).

Urea or ammonia may be injected upstream of emission control device 70 via ammonia injector 99. Ammonia and exhaust may be mixed via mixer 98. Engine exhaust may be sampled at measurement points 93 and 94 via exhaust measurement system 95 including differential sensor 90. Differential sensor 90 may include differential logic unit 92 in some examples.

Exhaust gas recirculation (EGR) may be provided to the engine via EGR system 14 including EGR valve 80. EGR valve 80 is a three-way valve that closes or allows exhaust gas to flow from downstream of emissions device 70 to a location in the engine air intake system upstream of compressor 162. In alternative examples, EGR may flow from upstream of turbine 164 to intake manifold 44. EGR may bypass EGR cooler 85, or alternatively, EGR may be cooled via passing through EGR cooler 85. In other, examples high pressure and low pressure EGR system may be provided.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 121 coupled to intake manifold 44; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Referring now to FIG. 2, a detailed view of the after treatment system 97 on a motor vehicle, in which the exhaust from an internal combustion engine is treated is shown. The part of the after treatment system 97 which is shown includes an exhaust duct 11, which opens into an SCR (Selective Catalytic Reaction) catalytic converter 70. An injection nozzle 99 is arranged upstream of the catalytic converter 70 according to the direction exhaust flow. The injection nozzle 99 injects aqueous ammonia into the exhaust duct 11.

A mixer 98 is arranged downstream of the injection nozzle 99, e.g. between the injection nozzle 99 and the catalytic converter 70. The mixer 98 serves to mix the ammonia with the exhaust. Depending on the characteristics of the exhaust system and/or of the after treatment system 97, the mixer 98 may be provided or is not required.

A system for measuring the quality of ammonia injection 95 is provided in the after treatment system 97. The ammonia measurement system 95 has a first measuring point 93, which is arranged in the exhaust duct 11 upstream of the position of ammonia injection. Here, the concentration of NOx in engine exhaust gas is measured. In one example, the ammonia measurement system senses NOx and ammonia via NOx sensors. In particular, NOx is sensed at measurement point 93 via a first NOx sensor, and NOx and ammonia is sensed at measurement point 94 via a second NOx sensor. The NOx sensors are sensitive to both NOx and ammonia. The second measuring point 94 is arranged downstream of the position of ammonia injection so as to enable detection of NOx and ammonia. If a mixer 98 is provided, as shown, the second measuring point 94 is also arranged downstream of the mixer 98. At the second measuring point 94, the total concentration of NOx and ammonia is measured.

The measurement system 95 furthermore comprises a differential logic unit 92, by way of which the NOx concentration is subtracted from the total concentration of NOx and ammonia. In this way, the concentration of ammonia in the exhaust gas is determined. The first measuring point 93, the second measuring point 94 and the differential logic unit 92 can be parts of a single differential sensor 90 that senses NOx and ammonia.

A processor or controller 12 is connected to the differential sensor 90 or to the differential logic unit 92 and processes the measurement signals. The processor 12 can be part of the differential sensor 90, the measurement system 95, the after treatment system 97 or can be a processor or control processor of the motor vehicle as shown, e.g. of the engine management system. The processor 12 is connected to the injection nozzle 99 or to a controller of the injection nozzle 99 in order to control injection of the aqueous ammonia. The differential logic unit 92 can be implemented in the processor 12.

In the processor 12, the measurement signals from differential sensor 90 are evaluated and, on this basis, decisions are taken, being executed in program routines or instructions, for example. The processor 12 can output control and/or status signals, e.g. to the injection nozzle 99 and to additional processor and information systems (not shown), which can be hierarchically subordinated, superordinated or equally ranked.

The evaluation of the measurement signals is discussed first of all below. If the value of the measurement signal is zero, this means that no ammonia is being injected. A measurement signal having a value or output greater than zero indicates that ammonia is being injected to the exhaust system to reduce NOx. The measured concentration can be converted into a mass flow of ammonia injected, this being expressed in mg/s for example. The measurement signals make it possible to check injection since it is known from the injection system or the engine management system whether injection is taking place or not at any particular moment.

The quantity of ammonia desired or injected should be between a maximum and a minimum limit. This can be checked by means of the known stipulated value for ammonia injection and by means of the measurement signal for the actual concentration of ammonia.

A clogged or blocked injection nozzle 99 can be detected from a mass flow that is below the expected value. If this is detected by the processor 12, a regeneration cycle can be initiated and/or a warning generated. During the regeneration cycle, the injection nozzle 99 can be heated in order to vaporize the deposits of ammonia. The warning can be a diagnostic message to indicate that the system should be serviced or can, for example, be a message to the engine management system indicating that the engine should be held in a particular operating range. Different responses are possible for a clogged or blocked injection nozzle 99, or identical measures can be taken.

This function of detecting a clogged or blocked injection nozzle can be checked for its ability to function. For this purpose, the ammonia concentration can be measured with the fuel supply switched off and a minimum injection of ammonia, and this ammonia concentration should then be within the minimum and maximum limits. With the fuel supply switched off, the NOx concentration is equal to zero, this allowing simple and reliable measurement of the ammonia concentration. This test can be carried out directly after a regeneration cycle, for example, in order to check complete vaporization of the deposits and the ability to function of the injection nozzle 99.

The deposition rate of the ammonia on the injection nozzle 99 can be calculated. Calculation of the deposition rate will be more accurate on a properly monitored injection nozzle 99 that has been freed from deposits. The deposition rate of the ammonia can be calculated by integrating the difference between the expected amount of ammonia and the measured amount of ammonia.

Given a knowledge of the deposition rate, the deposition of ammonia upstream of the SCR catalytic converter 70 can be calculated with respect to time. The amount can be stored in a non-volatile memory of the processor 12, for example. The amount deposited can be used for a heating strategy designed to vaporize the deposits. According to this heating strategy, provision can be made to heat the injection nozzle 99 at a particular level of deposition in order to vaporize the deposits on the injection nozzle 99 and in the area around the injection nozzle 99, that is to say also between the injection nozzle 99 and the SCR catalytic converter 70. The particular value for triggering heating can be chosen so that the injection nozzle 99 no longer becomes clogged, thus ensuring proper functioning for a longer period of time.

A memory model can furthermore be provided in the processor 12. The memory model models the after treatment system 97, especially the injection and/or deposition of the ammonia in the exhaust duct 11 upstream of the SCR catalytic converter 70. The memory model can be used inter alia to calculate the rate of ammonia to be injected. The memory model can then allow for the quantity of ammonia arising from the vaporization of the deposited ammonia in the quantity of ammonia required. This avoids incorrect setting of the after treatment system 97 through an increased ammonia concentration. Moreover, there may be a saving of ammonia injected to the exhaust system, and the deposition of ammonia is reduced since less ammonia has to be injected through the injection nozzle 99.

Based on the above mechanisms and models, the processor 12 controls the injection nozzle 99 in order to regulate the quantity of ammonia injected. There is a closed control loop involving measurement of the ammonia concentration, evaluation of the measurement signals and/or the memory model and including injection of ammonia through the injection nozzle 99.

Thus, the system of FIGS. 1 and 2 provides for an engine system, comprising: an engine including an exhaust passage; an ammonia injector positioned in the exhaust passage; a differential NOx and ammonia sensing device sensing exhaust gases upstream and downstream of the ammonia injector; and a controller including instructions for adjusting engine operation in response to an output of the differential NOx and ammonia sensing device. The engine system further comprises an exhaust gas mixing device, and where one input of the differential NOx and ammonia sensing device is positioned downstream of the exhaust gas mixing device.

The engine system also includes where the differential NOx and ammonia sensing device is comprised of two NOx sensors. Further, the engine system includes where the differential NOx and ammonia sensing device is located upstream of a SCR. The engine system also includes where the differential NOx and ammonia sensing device outputs a variable indicative of a difference between an output of a first NOx sensor and an output of a second NOx sensor. In one example, the engine system further comprises additional controller instructions to regenerate an ammonia injector nozzle in response to an output of the differential NOx and ammonia sensing device. The engine system further comprises additional controller instructions to determine an amount of ammonia deposited in an exhaust passage between a first input of the differential NOx and ammonia sensing device and a second input of the differential NOx and ammonia sensing device. The engine system also further comprises additional controller instructions for determining degradation of an ammonia injector.

Figure 3:
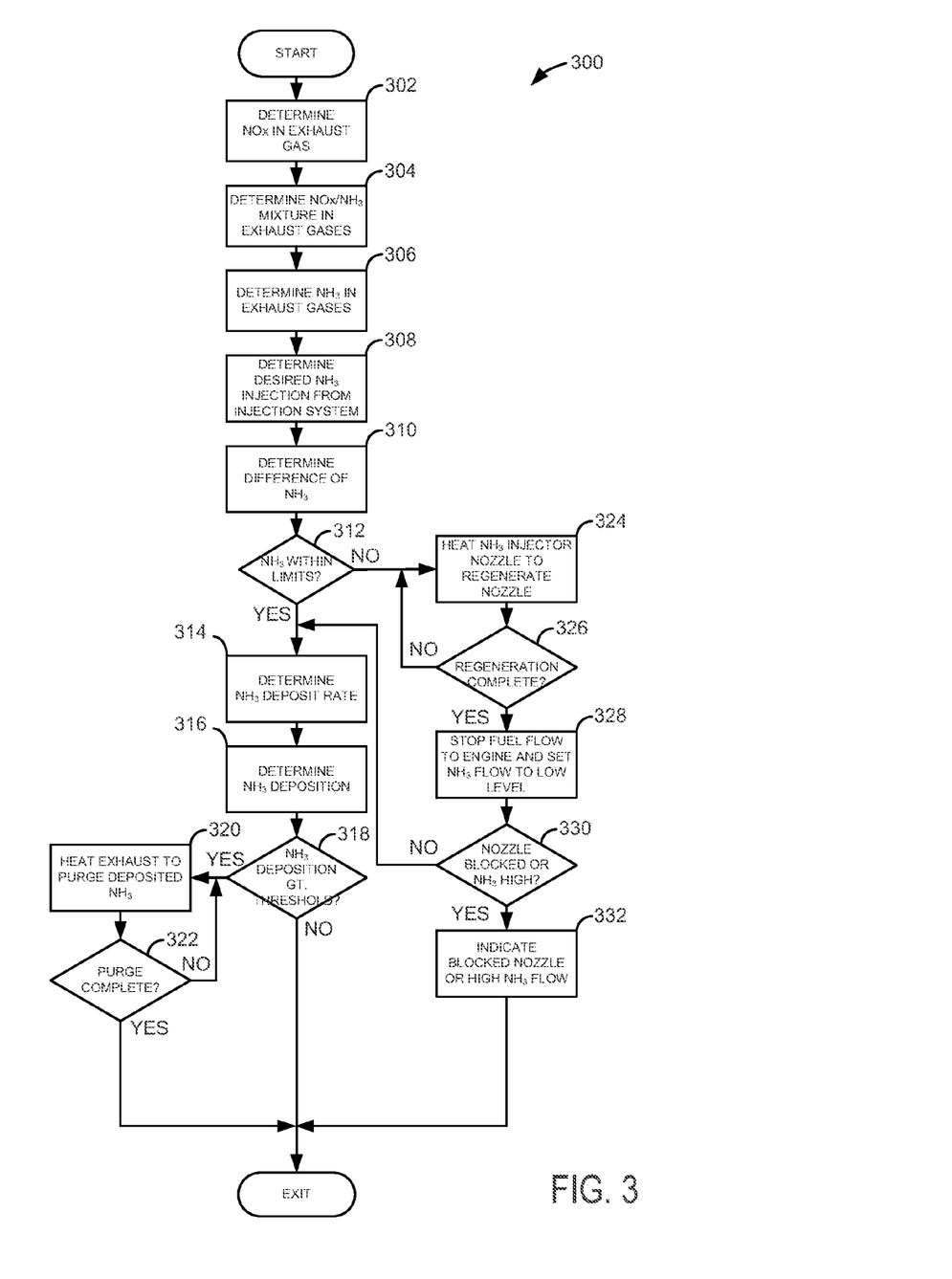
FIG. 3 is a method for determining the quality of ammonia for an exhaust gas after treatment system of a vehicle.

Referring now to FIG. 3, a flow diagram of a method for determining the quality of ammonia injection in the exhaust system of a motor vehicle is shown. The method of FIG. 3 is executable via instructions in controller 12 in the system shown in FIGS. 1 and 2. Further, the method of FIG. 3 may be executed during selected engine operating conditions such as during injection of ammonia to the engine exhaust system.

At 302, method 300 determines a concentration of NOx in untreated or feedgas engine exhaust. In one example, NOx concentration may be determined via a NOx sensor. The NOx concentration is multiplied by the engine exhaust mass flow rate to provide a NOx flow rate. In one example, the exhaust mass flow rate is equated to an engine air mass flow rate as determined via a mass air flow sensor. In other examples, the NOx concentration may be inferred via a model. Further, the NOx flow rate may be integrated over time to provide a mass of NOx during engine run time. Method 300 proceeds to 304 after the engine NOx flow rate is determined.

At 304, method 300 determines the combined concentration of NOx and ammonia in the vehicle exhaust system at a location in the exhaust system downstream of the ammonia injector. In one example, the combined concentration of NOx and ammonia is determined via a single NOx sensor placed in the engine exhaust system at a location downstream of a ammonia injector. In another example, the combined NOx and ammonia may be determined via a model. The combined NOx and ammonia is multiplied by the engine exhaust mass flow rate to provide a combined NOx and ammonia flow rate. The combined NOx and ammonia flow rate may be integrated over time to provide a mass of NOx and ammonia during engine run time. Method 300 proceeds to 306 after the combined NOx and ammonia flow rate is determined.

At 306, method 300 determines an amount of ammonia in the engine exhaust gases. The amount of ammonia may be determined by subtracting the amount of NOx as determined in the engine exhaust at a location upstream of an ammonia injector from the combined amount of NOx and ammonia in the engine exhaust at a location in the exhaust system downstream of the ammonia injector. The amount of ammonia may be determined over a predetermined interval of time. Method 300 proceeds to 308 after the amount of ammonia in the exhaust is determined.

At 308, method 300 determines a desired amount of ammonia injected to the engine exhaust system. The desired amount of ammonia may be determined via multiplying an injector on time by a transfer function that characterizes injector flow when ammonia is supplied to the injector at different pressures. Thus, the transfer function outputs a mass flow rate of ammonia when indexed via a pressure of ammonia supplied to the injector. The total mass of ammonia injected to the exhaust system is found by multiplying the injector on time by the ammonia mass flow rate. During a period of time multiple injections of ammonia may occur. The total amount of ammonia injected to the engine exhaust may be determined by adding the mass of ammonia injected to the exhaust at the different injection intervals. Method 300 proceeds to 310 after the amount of ammonia injected to the engine is determined.

At 310, method 300 determines a difference between the amount of ammonia injected according to the ammonia injection system (e.g., at 308) and the amount of ammonia detected in the exhaust gas downstream of the ammonia injector (e.g., at 306). If operation of the ammonia injector is degraded, less or more ammonia may be injected into the exhaust system than is desired. Method 300 proceeds to 312 after the difference between desired ammonia injected (e.g., at 308) and sensed ammonia (e.g., at 306) is determined.

At 312, method 300 judges whether or not the difference between the desired amount of ammonia injected and the sensed or actual amount of ammonia injected is greater that a first threshold or less than a second threshold. If the amount difference between amount of ammonia injected and sensed ammonia is greater than the first threshold or less than the second threshold, method 300 proceeds to 324. Otherwise, method 300 proceeds to 314.

At 314, method 300 determines an ammonia deposition rate. In one example, the ammonia deposition rate is the integrated difference between a desired amount of ammonia injected to the exhaust system and the amount of ammonia sensed in the exhaust system as determined at 310. The difference may be stored in memory. Method 300 proceeds to 316 after the ammonia deposition rate is determined.

At 316, method 300 determines the amount of ammonia deposited within the exhaust system upstream of the downstream NOx sensor. In one example, the deposition rate is multiplied by the time ammonia is allowed to deposit in the exhaust system to provide the amount of ammonia deposited in the exhaust system. Method 300 proceeds to 318 after the amount of ammonia deposited in the exhaust system is determined.

At 318, method 300 judges whether or not the amount of ammonia deposited in the exhaust system exceeds a threshold level. If so, method 300 proceeds to 320. Otherwise, method 300 exits.

At 320, method 300 heats the exhaust system to purge ammonia deposits from the exhaust system. In one example, exhaust gases are heated via retarding start of fuel injection timing and throttling the engine. In spark ignited engines, spark timing may be retarded to heat engine exhaust. Method 300 proceeds to 322 after engine exhaust gases have been heated.

At 322, method 300 judges whether or not ammonia purging from the exhaust is complete. In one example, ammonia purging is considered complete after the engine exhaust has reached a predetermined temperature for a predetermined amount of time. In other examples, the downstream NOx sensor may be used to determine if ammonia has been purged when the output of the downstream sensor is within a predetermined range of the output of the upstream NOx sensor so that the output of the differential sensor is substantially zero during exhaust gas heating. If ammonia purge from the exhaust system is complete, method 300 proceeds to exit. Otherwise, method 300 returns to 320.

At 324, method 300 heats the ammonia injector nozzle. In one example, the ammonia injector nozzle may be heated via exhaust gases. In another example, the ammonia injector nozzle may be electrically heated. Method 300 proceeds to 326 after the ammonia injector nozzle has been heated.

At 326, method 300 judges whether regeneration of the ammonia injector nozzle has completed. In one example, method 300 judges that regeneration of the ammonia injector nozzle is complete after the injector nozzle reaches a predetermined temperature for a predetermined amount of time. Method 300 proceeds to 328 if regeneration of the injector nozzle is complete. Otherwise, method 300 returns to 324.

At 328, method 300 stops fuel flow to the engine and injects ammonia to the exhaust system using a low flow command. In one example, fuel to the engine is deactivated during vehicle deceleration conditions. Thus, method 300 waits until the vehicle is decelerating and a low engine torque is requested before assessing whether or not the ammonia injector nozzle is plugged after an ammonia injector regeneration cycle. Method 300 also determines the difference in the desired amount of ammonia injected to the exhaust system and the sensed amount of ammonia in the exhaust system as described at 306-310. However at 328, combustion within the engine is stopped so that the downstream NOx sensor of the differential sensor indicates ammonia rather than NOx and ammonia. Thus, since no NOx is present in the engine exhaust upstream of the ammonia injector, the differential NOx and ammonia sensor simply reports the amount of ammonia injected to the exhaust system. Method 300 proceeds to 330 after ammonia is injected to the exhaust system.

At 330, method 300 judges whether the ammonia sensed in the exhaust system is greater than a first threshold amount or less than a second threshold amount. If the ammonia in the exhaust system is greater than the first threshold amount, it may be determined that the ammonia injector is leaking. If the ammonia in the exhaust system is less than a second threshold amount, it may be determined that the ammonia sensor is partially plugged. If it is judges that ammonia in the exhaust system is less or greater than expected, method 300 proceeds to 332. Otherwise, method 300 returns to 314.

At 332, method 300 indicates ammonia injection degradation via supplying an operator with a message or a light. In some examples, different messages for high and low ammonia flow may be provided. Further, in some examples, engine output power may be limited so as to limit NOx production during ammonia injector degradation. For example, start of injection timing advance may be limited or the amount of fuel injected to the engine may be limited. In some examples, boost pressure provided via a turbocharger may be limited during ammonia injector degradation. Method 300 proceeds to exit after ammonia injection degradation is indicated.

Thus, the method of FIG. 3 provides for a method for adjusting operation of an engine, comprising: adjusting an engine actuator in response to an output from a differential NOx and ammonia sensing device that is indicative of ammonia in engine exhaust, where the differential NOx and ammonia sensing device includes one input at a location in an exhaust system upstream of an ammonia injector and a second input at a location in the exhaust system downstream of the ammonia injector. The method includes where the differential NOx and ammonia sensing device is comprised of two NOx sensors. Further, the method includes where adjusting an engine actuator includes adjusting fuel injection timing. In one example, the method includes where the engine actuator is adjusted to limit engine output. The method also includes where the engine actuator is a turbocharger waste gate and where boost pressure is limited. The method further comprises heating an ammonia injector nozzle in response to the output of the differential NOx and ammonia sensing device. The method also further comprises stopping engine fuel flow in response to the output of the differential NOx and ammonia sensing device.

In another example, the method of FIG. 3 includes adjusting operation of an engine, comprising: adjusting an actuator in response to a difference in output between a first NOx sensor positioned in an engine exhaust system upstream of an ammonia injector and a second NOx sensor positioned in the engine exhaust system downstream of the ammonia injector. The method also includes where adjusting the actuator increases a tip temperature of the ammonia injector. The method further comprises stopping fuel flow to an engine in response to the difference in output of the first NOx sensor and the second NOx sensor, and where the first NOx sensor and the second NOx sensor are positioned in the engine exhaust system upstream of a SCR. The method also further comprises determining an amount of ammonia deposited in the engine exhaust system upstream of the second NOx sensor. The method also further comprises increasing exhaust gas temperature in response to the amount of ammonia deposited in the engine exhaust system exceeding a threshold level.

As will be appreciated by one of ordinary skill in the art, routines described in FIG. 3 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine system, comprising:
an engine including an exhaust passage;
an ammonia injector positioned in the exhaust passage;
a selective catalyst reaction (SCR) catalyst positioned downstream of the injector;
a differential NOx and ammonia sensing device sensing exhaust gases upstream and downstream of the ammonia injector, the sensing device positioned upstream of the SCR, the sensing downstream of the ammonia injector is still upstream of the SCR; and
a controller configured with a differential logic unit to determine the concentration of ammonia in the exhaust passage based on the sensed exhaust gases upstream and downstream of the ammonia injector, the controller further including instructions for adjusting engine operation in response to an output of the differential logic unit, including adjusting engine operation responsive to a deposition rate of ammonia in the exhaust passage calculated via a memory model, where adjusting engine operation increases an exhaust gas temperature to purge ammonia deposits in response to the deposition rate of ammonia calculated in the exhaust passage exceeding a threshold.

2. The engine system of claim 1, further comprising an exhaust gas mixing device, and where one input of the differential NOx and ammonia sensing device is positioned downstream of the exhaust gas mixing device.

3. The engine system of claim 1, where the differential NOx and ammonia sensing device is comprised of two NOx sensors.

4. The engine system of claim 1, where the differential NOx and ammonia sensing device outputs a variable indicative of a difference between an output of a first NOx sensor and an output of a second NOx sensor.

5. The engine system of claim 1, further comprising additional controller instructions to regenerate an ammonia injector nozzle in response to the output of the differential NOx and ammonia sensing device.

6. The engine system of claim 1, further comprising additional controller instructions to determine an amount of ammonia deposited in an exhaust passage between a first input of the differential NOx and ammonia sensing device and a second input of the differential NOx and ammonia sensing device.

7. The engine system of claim 1, further comprising additional controller instructions for determining degradation of the ammonia injector.

8. A method for adjusting operation of an engine, comprising:
adjusting an engine actuator in response to an output from a differential NOx and ammonia sensing device that is indicative of ammonia in engine exhaust, the differential NOx and ammonia sensing device including one input at a location in an exhaust system upstream of an ammonia injector and a second input at a location in the exhaust system downstream of the ammonia injector and upstream of a SCR catalyst,
using a memory model to calculate a deposition rate of ammonia in the exhaust system based on a difference between an expected amount of ammonia and a measured amount of ammonia over time, the measured amount of ammonia based on the differential NOx and ammonia sensing device located upstream of the SCR catalyst, and
increasing an exhaust as temperature to purge ammonia deposits in response to the calculated deposition rate of ammonia, the calculated rate based on the difference between the expected amount of ammonia and the measured amount of ammonia over time exceeding a threshold.

9. The method of claim 8, where the differential NOx and ammonia sensing device is comprised of two NOx sensors.

10. The method of claim 8, where adjusting the engine actuator includes adjusting fuel injection timing.

11. The method of claim 8, where the engine actuator is adjusted to limit engine output.

12. The method of claim 11, where the engine actuator is a turbocharger waste gate and where boost pressure is limited.

13. The method of claim 8, further comprising heating an ammonia injector nozzle in response to the output of the differential NOx and ammonia sensing device.

14. The method of claim 8, further comprising stopping engine fuel flow in response to the output of the differential NOx and ammonia sensing device.

15. A method for adjusting operation of an engine, comprising:
adjusting an actuator to increase an exhaust as temperature in response to a calculated ammonia deposition rate exceeding a threshold, the rate based on a memory model configured to process differences in output between a first NOx sensor positioned in an engine exhaust system upstream of an ammonia injector and a second NOx sensor positioned downstream of the ammonia injector and upstream of a SCR catalyst.

16. The method of claim 15, where adjusting the actuator increases a tip temperature of the ammonia injector.

17. The method of claim 15, further comprising stopping fuel flow to the engine in response to the difference in output of the first NOx sensor and the second NOx sensor.

18. The method of claim 15, further comprising determining an amount of ammonia deposited in the engine exhaust system upstream of the second NOx sensor.

* * * * *